United States Patent
Bennie, Jr.

(10) Patent No.: US 12,016,352 B1
(45) Date of Patent: Jun. 25, 2024

(54) BREWED ANIMAL FOOD PREPARATION METHODS

(71) Applicant: Anthony Lawrence Bennie, Jr., Cape Coral, FL (US)

(72) Inventor: Anthony Lawrence Bennie, Jr., Cape Coral, FL (US)

(73) Assignee: Clear Conscience Pet Holdings LLC, Lewes, DE (US)

( * ) Notice: Subject to any disclaimer, the term of this patent is extended or adjusted under 35 U.S.C. 154(b) by 0 days.

(21) Appl. No.: 15/929,144

(22) Filed: Aug. 2, 2019

Related U.S. Application Data

(60) Continuation of application No. 15/929,127, filed on Apr. 29, 2019, now abandoned, which is a division of application No. 15/294,520, filed on Oct. 14, 2016, now abandoned.

(60) Provisional application No. 62/241,673, filed on Oct. 14, 2015.

(51) Int. Cl.
| | |
|---|---|
| *A23K 10/18* | (2016.01) |
| *A23K 10/20* | (2016.01) |
| *A23K 10/22* | (2016.01) |
| *A23K 10/30* | (2016.01) |
| *A23K 10/35* | (2016.01) |
| *A23K 20/158* | (2016.01) |
| *A23K 20/174* | (2016.01) |
| *A23K 20/20* | (2016.01) |
| *A23K 50/48* | (2016.01) |

(52) U.S. Cl.
CPC .............. *A23K 10/18* (2016.05); *A23K 10/20* (2016.05); *A23K 10/22* (2016.05); *A23K 10/30* (2016.05); *A23K 10/35* (2016.05); *A23K 20/158* (2016.05); *A23K 20/174* (2016.05); *A23K 20/20* (2016.05); *A23K 50/48* (2016.05)

(58) Field of Classification Search
CPC .... A23K 10/18; A23K 20/158; A23K 20/174; A23K 50/48; A23K 10/20; A23K 10/22; A23K 10/30; A23K 10/35
USPC .......................................................... 426/61
See application file for complete search history.

(56) References Cited

U.S. PATENT DOCUMENTS

| | | | |
|---|---|---|---|
| 3,644,121 A | 2/1972 | Boyer et al. | |
| 6,066,355 A * | 5/2000 | Bezner | A23P 30/20 |
| | | | 426/650 |
| 9,295,271 B2 | 3/2016 | Rothamel | |

(Continued)

OTHER PUBLICATIONS https://www.petmd.com/blogs/thedailyvet/agallagher/2014/october/5-dos-and-donts-mixing-your-pets-food-32070.*

*Primary Examiner* — Donald R Spamer
*Assistant Examiner* — Philip A Dubois
(74) *Attorney, Agent, or Firm* — Kintner IP, LLC; Mary Frances Ludwig

(57) ABSTRACT

An animal food composition for preparation by brewing forms a broth and a mash when steeped in water. The brewed animal food may be served independently or as an additive to a standard pet meal. Methods of preparing the brewed animal food advantageously utilize widely available consumer brewing technologies. The composition includes a dehydrated proteinaceous food, and embodiments include digestive aids, heat resistant ingredients, herbal remedies, or minimal farinaceous components. Embodiments of the brewed animal food include complete and balanced meals, flavor enhancers, gravies, nutritional or vitamin supplements, pet beverages, and other ingesta for animals, especially domestic pets.

10 Claims, 3 Drawing Sheets

(56) References Cited

U.S. PATENT DOCUMENTS

| | | | |
|---|---|---|---|
| 2008/0069862 A1* | 3/2008 | Hurwitz | A61K 31/7048 514/5.5 |
| 2015/0079237 A1* | 3/2015 | Gamay | A23L 35/00 426/86 |
| 2015/0250211 A1 | 9/2015 | Rothamel | |

* cited by examiner

BREWED ANIMAL FOOD PREPARATION METHODS

CROSS REFERENCE TO RELATED APPLICATIONS

This application is a continuation of U.S. patent application Ser. No. 15/929,127, filed 29 Apr. 2019, which is a divisional of U.S. patent application Ser. No. 15/294,520, filed 14 Oct. 2016, which claims the filing benefit of U.S. Provisional Patent Application No. 62/241,673, filed 14 Oct. 2015, each of which are hereby incorporated by reference.

TECHNICAL FIELD

The present invention pertains generally to animal nutrition, and more particularly to brewed animal food and methods of preparing the same.

BACKGROUND OF THE INVENTION

The historical background of domestic animal nutrition reflects the crucial nature of this aspect of the caretaker relationship of humans to animals. Indeed, making the proper nutritional choices as humans for the animals under our care is among the most important determinative factors of the health, general welfare, vitality, longevity, and usefulness of those animals who have been made a part of human society, commerce, and family life. Some animals are brought into our personal lives to provide companionship. Others provide personal assistance as in the case of canines trained for protection, police, military, or as guides for visually impaired humans and as therapy-providing companions. Other animals are critically involved in human commerce and agriculture and provide us with assistance in the performance of agricultural work. Still others are raised as part of the human food production and agricultural economy. In all of these cases, human beings assume responsibility for the health and nutrition of the animals under their care.

The inventor has observed that proper feeding of domestic companion animals, most notably dogs and cats, requires research and validation according to the principles of evolutionary biology and science-based adherence to nutritional requirements of these species, and that no matter what species of animal is under the guardianship of humans at any given time, the same principles of feeding a properly researched and biologically suitable optimal diet for the species of animal being fed applies.

Special attention must be paid, therefore, to ensuring that animals under human care consistently accept and consume the foods given them to achieve optimal health, well-being, and longevity. Many domestic animals suffer from loss of appetite due to factors such as age related decreased acuity in sense of smell and taste ("taste fatigue"); bland or unappealing prescription or specialty diets; difficulty chewing due to dental or periodontal disease; illness; and disease treatments such as chemotherapy.

The brewed animal food and method of meal preparation described herein increase meal palatability, improve digestibility, increase nutrient availability, and guarantee proper hydration of animal food, as recommended by veterinarians and animal nutrition researchers. The brewing method enables rapid and convenient preparation, using common household brewing equipment. The food and method address the challenges of feeding picky, elderly, or ailing pets, as well as providing optimal nutrition in a palatable form to well animals. The food and methods offer simplicity, convenience, and generate less waste than commonly used alternatives.

BRIEF SUMMARY OF THE INVENTION

The present invention is directed to a brewed animal food and preparation methods therefor. This innovative food composition is specially designed to stimulate the appetite and increase mealtime enjoyment for animals. Embodiments of the brewed animal food include complete and balanced meals, flavor enhancers, gravies, nutritional or vitamin supplements, pet beverages, and other ingesta for animals especially domestic pets. The brewed animal food may be served independently or as an additive to a standard pet meal. Methods of preparing the brewed animal food advantageously utilize widely available consumer brewing technologies.

In accordance with an embodiment, the animal food composition includes a dehydrated proteinaceous food and forms a broth and a mash when steeped in water. In accordance with another embodiment, the mash is edible. In accordance with another embodiment, the dehydrated proteinaceous food is an animal derived protein.

In accordance with another embodiment, the animal food composition includes at least one of: dried vegetable, dried fruit, dehydrated dairy product, digestive aid, nutritional supplement, fat solids, herbs, and medicinal components.

In accordance with another embodiment, the animal food composition has a water activity of 0.8 or below.

In accordance with another embodiment, the dehydrated proteinaceous food comprises at least 30% of the animal food composition. In accordance with another embodiment, the dehydrated proteinaceous food comprises at least 50% of the animal food composition.

In accordance with another embodiment, the animal food composition includes a digestive aid selected from the group consisting of prebiotics, probiotics, digestive enzymes, and herbs. In accordance with another embodiment the digestive aid is heat resistant.

In accordance with another embodiment, the animal food composition includes less than 25% farinaceous components.

In accordance with another embodiment, the animal food composition has a complete and balanced nutrient profile.

Other embodiments, in addition to the embodiments enumerated above, will become apparent from the following detailed description, taken in conjunction with the accompanying drawings, which illustrate, by way of example, the principles of the brewed animal food and preparation methods.

Figure 1:
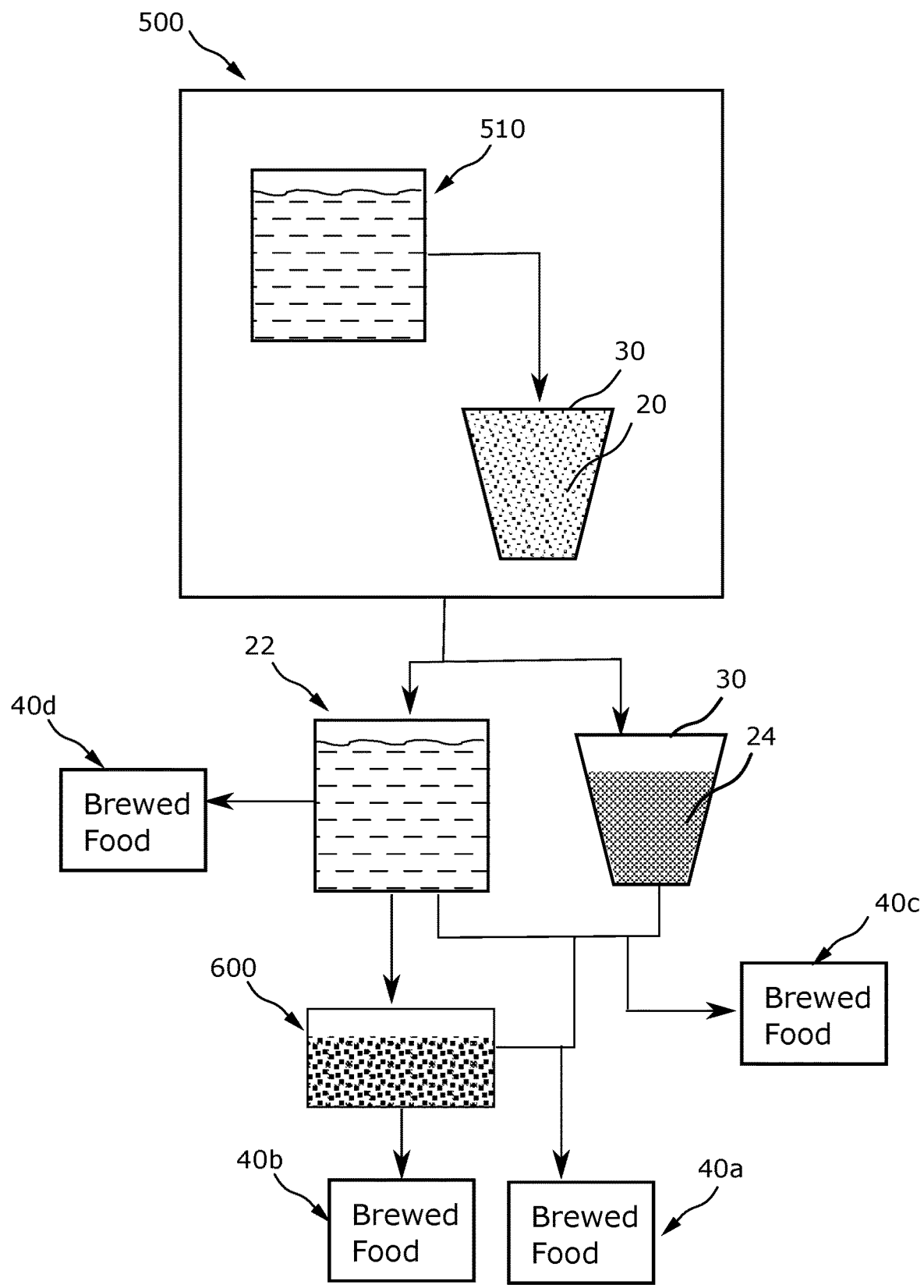
FIG. 1 is a schematic diagram of a method of preparing a brewed animal food.

LIST OF DRAWING REFERENCE NUMERALS 20 animal food composition
22 broth
24 mash
30 container
40 brewed animal food
500 brewing device
510 water
600 pet food

DETAILED DESCRIPTION OF THE INVENTION

Referring initially to FIG. 1, there is illustrated a schematic diagram of a method of preparing a brewed animal food. The term 'food' as used herein includes nutriment in solid and liquid forms, and combinations thereof. An animal food composition 20 is placed in a container 30 suitable for brewing. Composition 20 is configured to form two components when steeped: a broth 22 and a mash 24.

Broth 22 is comprised of the water in which composition 20 has been steeped and is infused with the flavors, nutritional or medicinal components, or a soluble portion of composition 20. Depending upon the ingredients of composition 20, broth 22 may be described as a gravy, sauce, broth, tea, or the like.

Mash 24 is comprised of the saturated or semi-moist solid components of composition 20 which remain after composition 20 has been steeped or brewed. In many embodiments, mash 24 is an edible, nutritious, moist, and highly palatable component.

Container 30 may be a single serving package which is either porous or intended to be punctured for brewing; a porous medium such as a coffee filter or tea bag; a mesh basket; or other suitable device. In an embodiment, composition 20 is pre-packaged for use in a container 30 designed for single use. In other embodiments, the user places a measured amount of composition 20 in container 30 prior to brewing.

In embodiments, container 30 is configured to cooperate with a brewing device 500. Examples of brewing device 500 include various styles of single serving beverage appliances, a coffee pot, a French press, and others well known in the art.

In the embodiment of FIG. 1, brewing device 500 causes water 510 to pass through container 30 which contains a portion of composition 20. Brewing device 500 may heat the water 510, such as in a single serving brewing device or coffee pot. Alternatively, the user may preheat water 510 and add heated water 510 to brewing device 500, as in the case of a French press. In another embodiment, composition 20 is steeped in water 510 without the use of a brewing device 500, such as by steeping in a dish. In other embodiments, composition 20 is cold-brewed or ice brewed by steeping in chilled or ambient temperature water.

Brewing dehydrated animal food composition 20 generates broth 22 and mash 24, which are each nutrient-rich and highly palatable. In an embodiment, mash 24 is removed from container 30 and combined with a pet food 600. Broth 22 is added to the mash and pet food mixture and stirred to combine. The combination of broth 22, mash 24, and pet food 600 are then served to the animal, designated as brewed animal food 40a in FIG. 1.

In an embodiment, broth 22 is poured over pet food 600 to enhance the nutritional content or palatability of pet food 600. Where pet food 600 is dried (such as kibble), freeze-dried, or dehydrated, pet food 600 is soaked in broth 22 for a period of time suitable to hydrate food 600. The mixture of broth 22 and food 600, designated food 40b in FIG. 1, is served to the animal and mash 24 is discarded.

In another embodiment, the broth 22 and mash 24 formed when composition 20 is brewed are combined and served directly to the animal without addition of other pet food 600. This combination is designated food 40c in FIG. 1. Composition 20 is formulated to provide a complete and balanced meal, as defined by industry recognized authorities, such as the American Association of Food Control Officers (AAFCO) and the National Research Council (NRC) of the National Academy of Sciences in the USA.

In another embodiment broth 22 is served directly to the animal as a "pet tea", without being combined with the mash. No additional pet food is added in this embodiment, designated food 40d in FIG. 1.

In another embodiment, composition 20 is formulated to balance a raw protein diet. Composition 20 includes essential vitamins and minerals which are often lacking or deficient in home-prepared raw protein diets. In this embodiment brewed composition 20 is combined with the regular raw protein serving to form a complete and balanced meal.

Composition 20 includes a dehydrated proteinaceous food such as meat, poultry, seafood, eggs, dairy products, or processed soy products, to satisfy the nutritional requirements of and improve palatability towards carnivorous animals such as dogs and cats. In an embodiment, the dehydrated proteinaceous food comprises at least 30% of composition 20.

Composition 20 has a water activity of 0.8 or below, which enables the composition to be readily brewed. This level of water activity also ensures a shelf stable animal food product.

Numerous embodiments of composition 20 are envisioned for compatibility with various animal nutrition applications. Examples of the animal food composition are given below. Percent symbols (%) indicate percent by weight of the total composition. One skilled in the art will recognize that numerous modifications, combinations, variations, and rearrangements may be made without deviating from the spirit or scope of the invention. The following examples are not to be construed as limiting the scope of the invention.

As used in this application, the term "about" or "approximately" refers to a range of values within plus or minus 10% of the specified number. As used in this application, the term "substantially" means that the actual value is within about 10% of the actual desired value of any variable, element or limit set forth herein.

Examples I-III of composition 20 are formulated for combination with a secondary pet food, such as dehydrated foods or kibble. These embodiments include at least 50% dehydrated proteinaceous food. In these embodiments the dehydrated proteinaceous component is an animal derived protein, targeting the compositions at carnivorous animals. Other ingredients are chosen to improve nutrient balance or to supplement the diet such as dried vegetables, dried fruits, dehydrated dairy products, digestive aids, nutritional supplements, fat solids, herbs, or medicinal components.

One recommended portion size for Examples I-III is 14 grams total dried weight (prior to brewing). In this portion size, the compositions below provide the same amount or more of required dietary nutrients as an approximately 3 ounce net weight canned pet food, a common commercially available portion. Furthermore, this recommended portion is suitable for use with containers 30 compatible with single portion brewing devices 500. It is obvious that these and similar recipes are readily scalable to create larger or smaller portions.

| Component | Wt % |
|---|---|
| *Example I: Light cream style gravy* | |
| Fish powder | 57.1% |
| Yogurt powder | 14.3% |
| Dried parmesan cheese powder | 14.3% |
| Powdered light colored vegetables | 14.3% |
| Total: | 100.0% |
| *Example II: Brown style gravy* | |
| Dry powdered natural beef liver | 57.3% |
| Powdered dark colored mixed vegetat | 21.3% |
| Granulated kelp | 10.7% |
| Milled flaxseed | 10.7% |
| Total: | 100.0% |
| *Example III: Red style gravy* | |
| Dried pork liver | 57.2% |
| Tomato powder | 28.6% |
| Kelp | 7.1% |
| Milled flaxseed | 7.1% |
| Total: | 100.0% |

In embodiments, composition 20 contains less than 25% farinaceous components. It is desirable to keep the proportion of farinaceous components low, as grains contribute little to none of the nutrients required by carnivores, such as cats and dogs, and do not improve palatability. Examples I-III above are substantially grain-free, meaning they contain only trace amounts of grain.

Example IV of composition 20 has a complete and balanced nutrient profile. When formulated with a total dried weight of 18 grams, this recipe includes macro and micronutrient quantities equivalent to those commonly found in a 3 ounce can of cat food.

| Example IV: Complete & Balanced Cat Meal | |
|---|---|
| Component | Wt % |
| Salmon protein hydrolysate | 58.2% |
| Dried butterfat solids | 27.8% |
| Milled flaxseed | 5.6% |
| Chia seed | 5.6% |
| Multi vitamin and mineral supplement | 2.8% |
| Total: | 100.0% |

In the above recipe, nutritional equivalence could be achieved by substituting the fish powder with numerous dry, highly digestible, and species-appropriate protein ingredients such as dried beef and pork liver powders, freeze dried proteins, or other moisture-removed, dehydrated, or dry roasted proteins. The vitamin and mineral supplement is included for the composition to meet the requirements of a complete and balanced diet. Again, it is obvious that this and similar recipes are readily scalable to create larger or smaller portions, such as complete and balanced meals for dogs of various sizes, or large portions suitable for serving multiple meals.

In another embodiment, composition 20 includes cannabidiol (CBD) as a medicinal component. In an exemplary embodiment, 25 mg of hemp-based CBD is added to a 14g serving portion of any of Examples I-III above.

Examples V-VI of composition 20 are based on the principles of Traditional Chinese Medicine (TCM). When brewed these embodiments form a broth and an edible mash which are both served to the animal directly, or in combination with a secondary pet food. These embodiments include approximately 30% or more dehydrated proteinaceous food.

| Component | Wt % |
|---|---|
| *Example V: TCM "cooling" supplement* | |
| Yogurt powder | 27.3% |
| Dried tomato | 27.3% |
| Dried cucumber | 18.2% |
| Dried or granular kelp | 18.2% |
| Dried spirulina algae | 9.0% |
| Total: | 100.0% |
| *Example VI: TCM "warming" supplement* | |
| Dried chicken liver | 33.3% |
| Dried sweet potato | 25.0% |
| Dried kale | 12.5% |
| Dried carrot | 12.5% |
| Dried coconut | 8.3% |
| Dried cherry powder | 4.2% |
| Fennel | 2.1% |
| Ginger | 2.1% |
| Total: | 100.0% |

Figure 2:
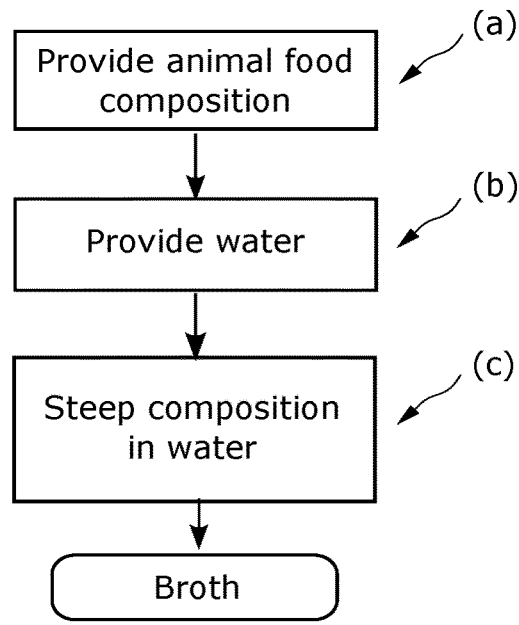
FIG. 2 is a flow diagram of a method of preparing the brewed animal food.

Examples VII-IX of composition 20 are designed to create a broth infused with aromatic or therapeutic components for the benefit of the target animal species. Recipes of this type are intended to be served as a beverage, or broth alone, as illustrated by brewed food 40*d* (FIG. 1) and in FIG. 2. In this method the remaining mash is not served to the animal. In this embodiment, composition 20 contains valuable compounds to be infused into the broth.

| Component | Wt % |
|---|---|
| *Example VII: Herbal tea 1 for dogs* | |
| Chamomile | 33.3% |
| Dried chicken liver | 33.3% |
| Dried sweet potato | 33.4% |
| Total: | 100.0% |
| *Example VIII: Herbal tea 2 for dogs* | |
| Dried lavender flower | 33.3% |
| Dried beef liver | 33.3% |
| Dried sweet potato | 33.4% |
| Total: | 100.0% |
| *Example IX: Herbal tea for cats* | |
| Dried catnip flower | 33.3% |
| Dried chicken liver | 33.3% |
| Dried sweet potato | 33.4% |
| Total: | 100.0% |

Further examples of this embodiment include herbal preparations, homeopathic preparations, meat based broths including bone broths, consumable aromatherapy beverages, and dietary supplements such as vitamins, minerals, herbs, and enzymes such as those used to aid digestion. Examples VII-IX include at least 30% dehydrated proteinaceous food, providing palatability enhancement for carnivorous species. While the term "tea" is generically used to refer to such compositions, this is not a specific reference to the beverages widely consumed by humans and known as "teas", many of which are not considered suitable for canine or feline consumption.

Example X of composition 20 is a bone broth recipe enhanced with Chondroitin Sulfate (a joint health nutrient). This composition is designed to form both a broth and an edible mash, and may be served as either broth alone or broth with mash for increased palatability and nutrient delivery.

| Example X: Bone broth | |
|---|---|
| Component | Wt % |
| Beef collagen | 29.1% |
| Dried beef liver | 21.8% |
| Dried beef bone marrow | 21.8% |
| Dried sweet potato | 14.5% |
| Kelp | 7.3% |
| Chondroitin sulfate | 5.5% |
| Total: | 100.0% |

Many common brewing methods use water heated to 160 degrees Fahrenheit (° F.) or above. Some ingredients which may benefit the digestive health of animals are heat sensitive, and can lose some or all of their efficacy if subject to temperatures present in common brewing devices. Examples include: live probiotic bacteria, active glandular digestive enzymes, and plant based digestive enzymes. Embodiments of the composition foster improved digestion of foods and overall gastrointestinal health by including ingredients that are effective in aiding digestion ("digestive aids") such as prebiotics, which promote the growth of beneficial bacteria in the digestive tract, probiotics, digestive enzymes, and some herbs. An embodiment of composition 20 includes a digestive aid which is heat resistant, meaning that it retains its nutritive value or beneficial properties when exposed to temperatures commonly used in brewing.

Heat resistant digestive aids include various prebiotics, heat stabilized probiotics, herbal digestive aids, and others well known in the art. Specific heat resistant digestive aids include: Senna Leaf (*Senna alexandrina*); Cascara Sagrada (*Rhamnus purshiana*); Aloe Leaf (Aloe vera); Chia Seeds (*Salvia hispanica*); Psyllium seed (*Plantago* sp.); Marshmallow Root (*Althaea officinalis*); Slippery Elm Bark (*Ulmus rubra*); Mullein Leaf (*Verbascum* sp.); Barberry Root (*Berberis vulgaris*); Dandelion (*Taraxacum* sp.); Artichoke (*Cynara cardunculus* var. *scolymus*); Fennel (*Foeniculum vulgare*); Cardamom (*Elettaria cardamomum*); Dill (*Anethum graveolens*); Caraway (*Carum carvi*); Cumin (*Cuminum cyminum*); and Lemon Balm (*Melissa officinalis*).

Further provided is a brewing device 500 specifically configured for preparing the brewed animal foods described herein. This device is temperature regulated to brew with warm water, thereby avoiding the detrimental effects of heat on some ingredients as described above. In an embodiment, the device brews with water which is heated to between about 100° F. and about 140° F. While cold-brewing methods could also be used to prepare the supplement, the benefits of warm brewing described herein would not be realized. In another embodiment, the device is configured to brew various different portion sizes for different sized animals.

A method of preparing an animal food includes (refer to FIG. 1-2):
(a) providing an animal food composition 20 configured to form a broth 22 when steeped in water 510, the composition comprising a dehydrated proteinaceous food;
(b) providing water 510; and,
(c) steeping animal food composition 20 in water 510 thereby forming broth 22.

Figure 3:
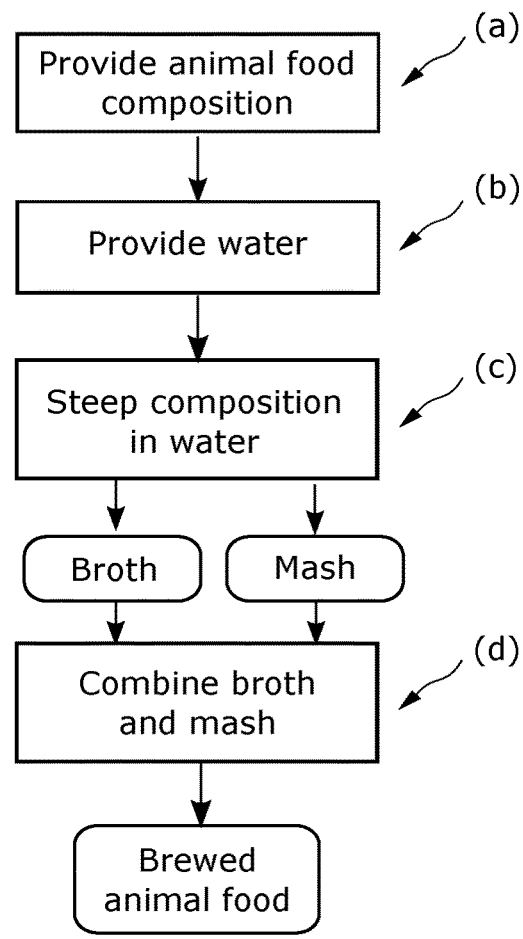
FIG. 3 is a flow diagram of another embodiment of the method.

The method further including (refer to FIGS. 1 & 3):
in (a), animal food composition 20 having a water activity of 0.8 or below and being configured to form an edible mash 24 when steeped in water 510;
in (c), forming a mash 24; and,
(d) combining the broth 22 and the mash 24 to form a brewed animal food 40.

Figure 4:
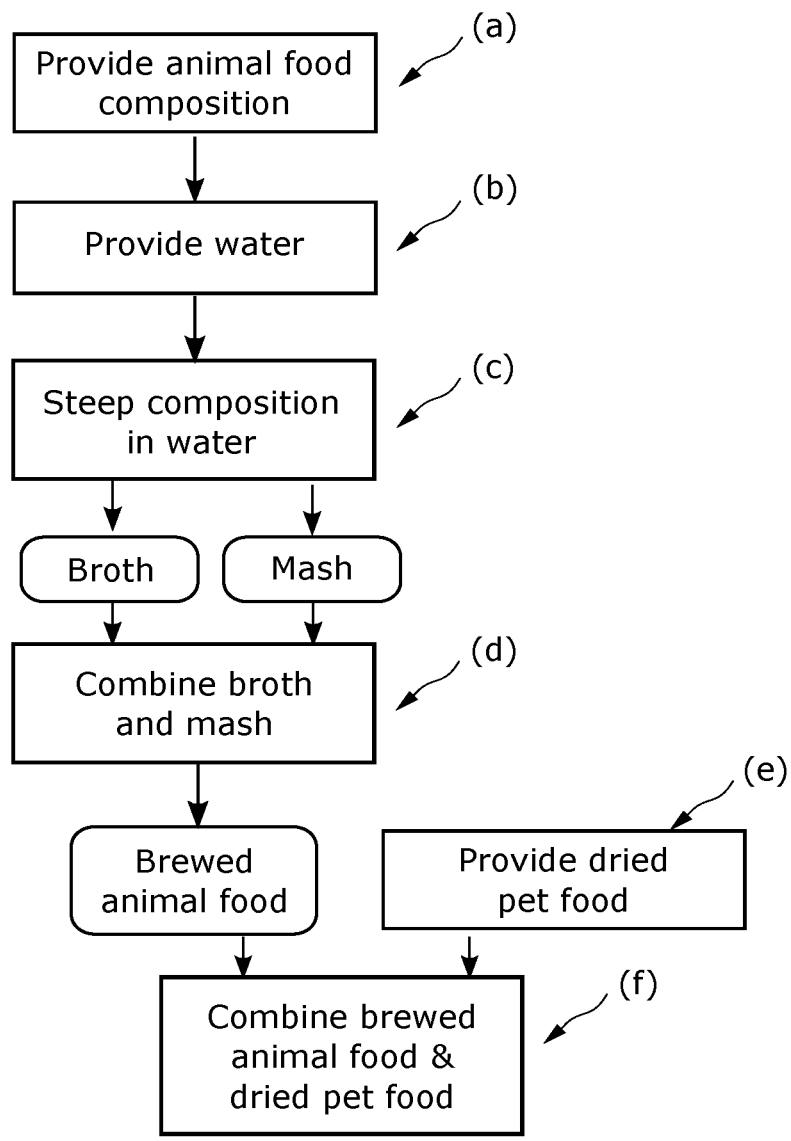
FIG. 4 is a flow diagram of another embodiment of the method.

The method further including (refer to FIGS. 1 & 4):
(e) providing a dried pet food 600; and,
(f) combining the brewed animal food 40 with dried pet food 600.

The method further including (refer to FIG. 1):
before (c), heating the water 510 to between about 100 and about 140 degrees Fahrenheit.

The method further including (refer to FIG. 1):
providing a beverage brewing device 510; and,
in (a), animal food composition 20 packaged in a container 30 configured to cooperate with beverage brewing device 510.

The embodiments of the brewed animal food and preparation methods described herein are exemplary and numerous modifications, combinations, variations, and rearrangements can be readily envisioned to achieve an equivalent result, all of which are intended to be embraced within the scope of the appended claims. Further, nothing in the above-provided discussions of the compositions and methods should be construed as limiting the invention to a particular embodiment or combination of embodiments. The scope of the invention is defined by the appended claims.

I claim:
1. A method of preparing an animal food, the method comprising:
(a) providing an animal food composition packaged in a container, the composition consisting of:
a soluble portion configured to form a broth when steeped in water;
an insoluble food portion configured to form a nutritious edible mash when steeped in water, the insoluble food portion consisting of a powdered food, a milled food, a granulated food, seeds, or a combination thereof;
wherein the soluble portion and the insoluble food portion comprise at least 50% by weight of animal derived dehydrated proteinaceous food;
wherein the soluble portion and the insoluble food portion consists of dry powdered natural beef liver, powdered dark colored mixed vegetables, granulated kelp, and milled flaxseed; and,
wherein the composition is substantially free of grain;
(b) providing water; and,
(c) steeping the animal food composition in the water thereby forming a broth which passes through the container and a nutritious edible mash which is retained in the container.

2. The method according to claim 1, further including:
in (a), the animal food composition having a water activity of 0.8 or below; and
after (c), combining the broth and the mash to form a brewed animal food.

3. The method according to claim 2 further including:
providing a dried pet food external to the container; and
after (c), combining the brewed animal food with the dried pet food.

4. The method according to claim 1, further including:
before (c), heating the water to between about 100 and about 140 degrees Fahrenheit.

5. The method according to claim 1, further including:
providing a beverage brewing device; and,
in (a), the container configured to cooperate with the beverage brewing device.

6. The method according to claim 1, further including:
providing a dried pet food external to the container; and
after (c), combining the broth with the dried pet food.

7. A method of preparing an animal food, the method comprising:
(a) providing an animal food composition packaged in a container, the composition consisting of:
a soluble portion configured to form a broth when steeped in water;
an insoluble food portion configured to form a nutritious edible mash when steeped in water, the insoluble food portion consisting of a powdered food, a milled food, a granulated food, seeds, or a combination thereof;
wherein the soluble portion and the insoluble food portion consists of:
58.2% by weight animal derived dehydrated proteinaceous food selected from: fish powder, dried beef liver powder, and dried pork liver powder;
27.8% by weight dried butterfat solids;
5.6% by weight milled flaxseed;
5.6% by weight chia seed; and
2.8% by weight vitamin and mineral supplements; and
wherein the composition is substantially free of grain;
(b) providing water; and
(c) steeping the animal food composition in the water thereby forming a broth which passes through the container and a nutritious edible mash which is retained in the container.

8. A method of preparing an animal food, the method comprising:
(a) providing an animal food composition packaged in a container, the composition consisting of:
a soluble portion configured to form a broth when steeped in water, the insoluble food portion consisting of a powdered food, a milled food, a granulated food, seeds, or a combination thereof;
an insoluble food portion configured to form a nutritious edible mash when steeped in water;
wherein the soluble portion and the insoluble food portion comprise at least 50% by weight of animal derived dehydrated proteinaceous food;
wherein the soluble portion and the insoluble food portion consists of: fish powder, yogurt powder, dried parmesan cheese powder, and powdered light colored vegetables; and,
wherein the composition is substantially free of grain;
(b) providing water; and,
(c) steeping the animal food composition in the water thereby forming a broth which passes through the container and a nutritious edible mash which is retained in the container.

9. A method of preparing an animal food, the method comprising:
(a) providing an animal food composition packaged in a container, the composition consisting of:
a soluble portion configured to form a broth when steeped in water;
an insoluble food portion configured to form a nutritious edible mash when steeped in water, the insoluble food portion consisting of a powdered food, a milled food, a granulated food, seeds, or a combination thereof;
wherein the soluble portion and the insoluble food portion comprise at least 50% by weight of animal derived dehydrated proteinaceous food;
wherein the soluble portion and the insoluble food portion consists of: dried pork liver, tomato powder, granulated kelp, and milled flaxseed; and
wherein the composition is substantially free of grain;
(b) providing water; and,
(c) steeping the animal food composition in the water thereby forming a broth which passes through the container and a nutritious edible mash which is retained in the container.

10. A method of preparing an animal food, the method comprising:
(a) providing an animal food composition packaged in a container, the composition consisting of:
a soluble portion configured to form a broth when steeped in water;
an insoluble food portion configured to form a nutritious edible mash when steeped in water, the insoluble food portion consisting of a powdered food, a milled food, a granulated food, seeds, or a combination thereof, and
wherein the soluble portion and the insoluble food portion consists of:
29.1% by weight beef collagen;
21.8% by weight dried beef liver;
21.8% by weight dried beef bone marrow;
14.5% by weight dried sweet potato;
7.3% by weight granulated kelp; and
5.5% by weight chondroitin sulfate;
(b) providing water; and,
(c) steeping the animal food composition in the water thereby forming a broth which passes through the container and a nutritious edible mash which is retained in the container.

* * * * *